United States Patent Office 3,506,446
Patented Apr. 14, 1970

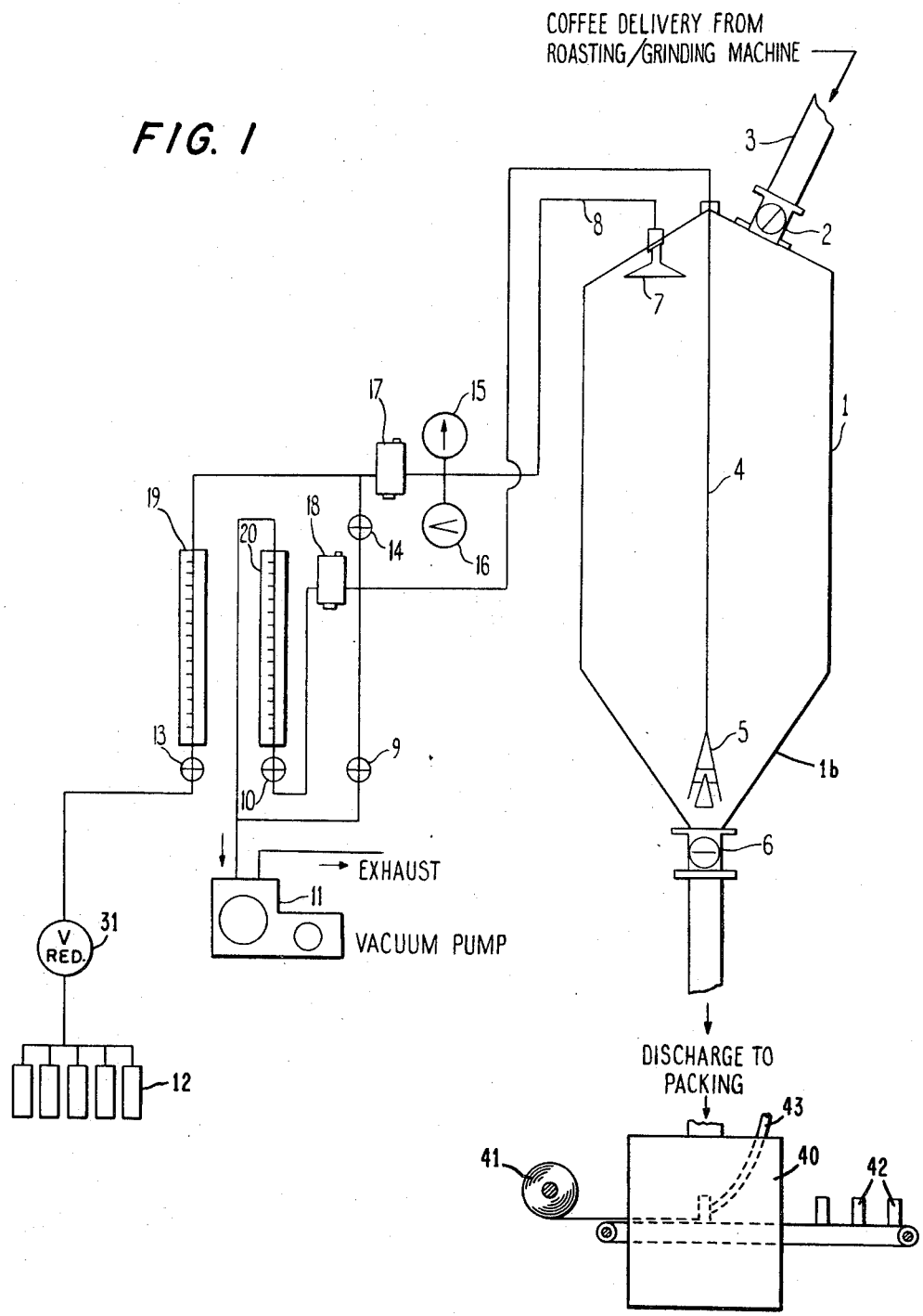

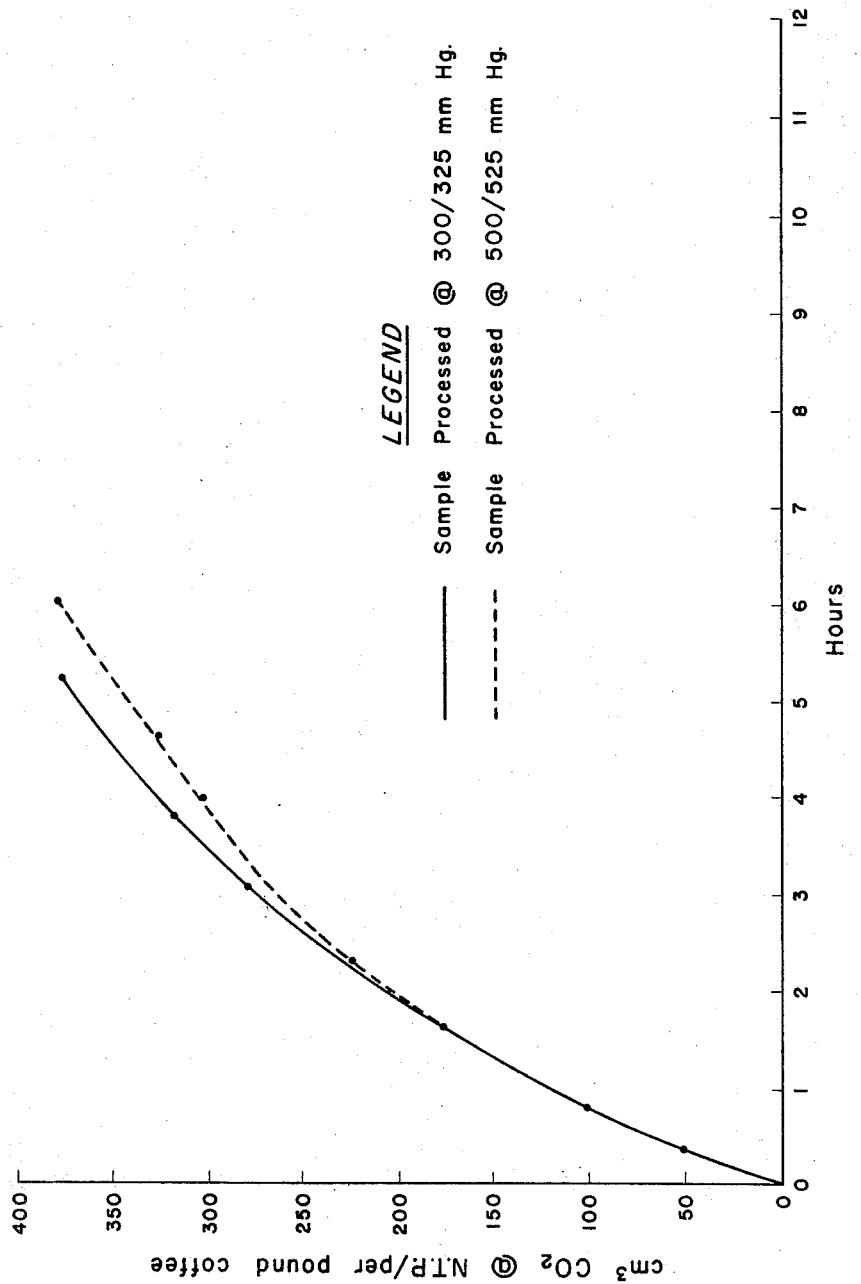

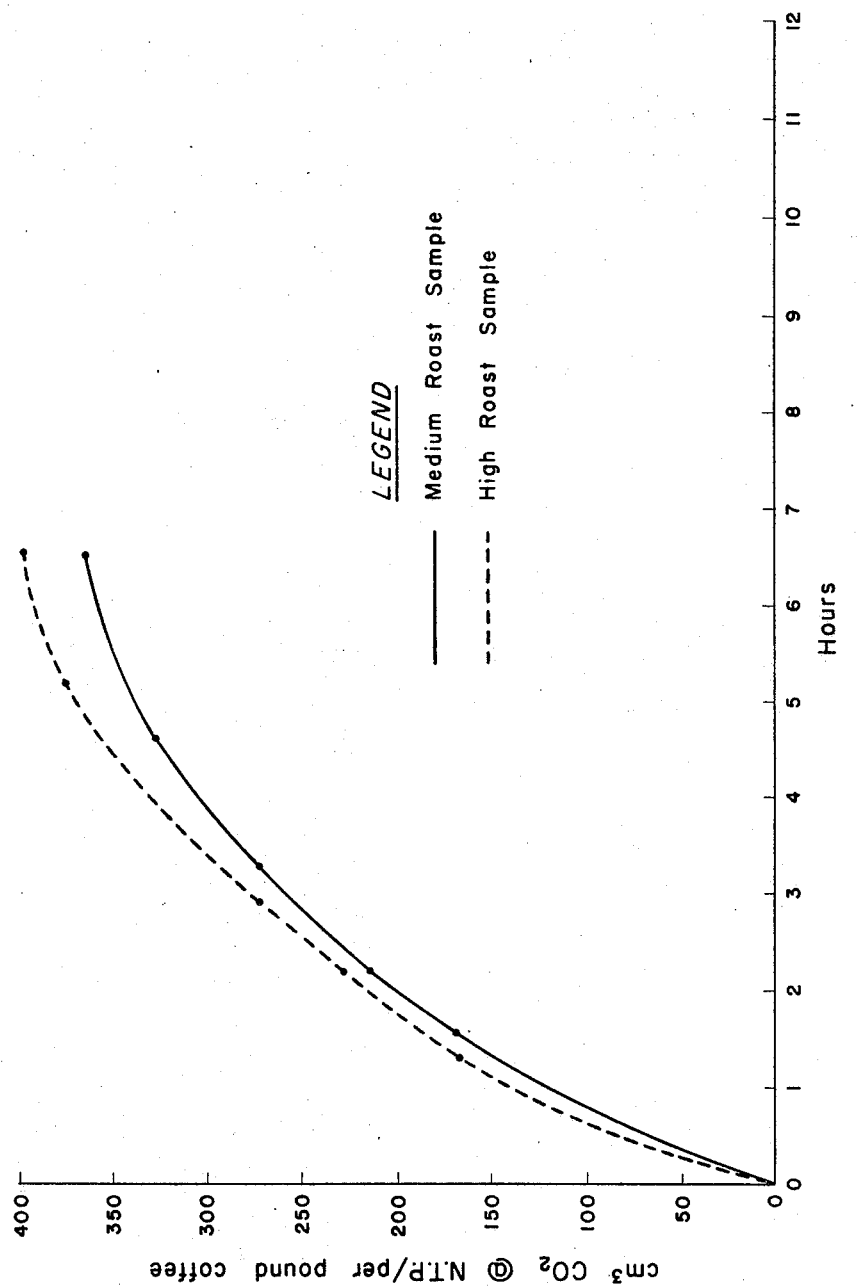

3,506,446
PROCESS FOR CONDITIONING FRESHLY ROASTED COFFEE
Ronald Cheyney Champion, Crawley, Sussex, England, assignor to Kenco Coffee Company Limited, London, England, a British company
Filed Oct. 14, 1968, Ser. No. 767,443
Claims priority, application Great Britain, Oct. 16, 1967, 47,058/67
Int. Cl. A23f 1/02
U.S. Cl. 99—68      14 Claims

ABSTRACT OF THE DISCLOSURE

A process for conditioning freshly roasted coffee to remove $CO_2$ therefrom. To accelerate evolution of the $CO_2$ from the cells of the coffee, the coffee is confined in a space evacuated to a sub-atmospheric pressure level, but a pressure level which is in a range above the vapor pressures of at least the majority of the volatile constituents of the coffee, the coffee being maintained in said space until sufficient $CO_2$ has evolved from the coffee cells to allow final packaging of the coffee in sealed containers.

BACKGROUND OF THE INVENTION

In processing coffee, and more specifically as an incident of roasting coffee, carbon dioxide is generated in the coffee cells and evolves therefrom. The rate at which the $CO_2$ evolves can vary depending on the degree of roast, to an extent upon the type of coffee being used and whether the coffee is in ground or whole bean form, but most generally, the natural evolution of $CO_2$ from the coffee cells continues for a period of from several days to two weeks. Thus, if the coffee on being roasted and ground is immediately packed in a metal container of the usual type, it is possible that the container in time could rupture, since the $CO_2$ gas continues to evolve within the container producing pressures which in some instance can reach as high as 30 to 40 p.s.i.g. To overcome this suggests that before final packaging of the coffee, $CO_2$ be allowed merely to evolve from the coffee naturally to an extent that upon packaging the $CO_2$ gas remaining in the coffee cells will have been reduced to such level that further gas emission within the packaging container will not create pressures incompatible with the structural character of the packaging container. However, to allow coffee to stand too long before packaging increases the likelihood of oxidation of many of the flavor and aroma-giving constituents thereof. Oxidation, as is well known, causes staleness of the coffee. Thus it is possible for coffee to become somewhat staled even before it is packaged in a container. Various means are known to circumvent this problem as, for example, vacuum packaging of the coffee in metal cans. Vacuum packaging excludes air from the cans and also provides a void into which $CO_2$ gas emitted from the coffee can expand. However, since the cost of a metal can capable of withstanding post-packaging $CO_2$ emission pressures is a relatively large item in the overall processing costs of coffee it would be advantageous if less expensive lightweight metallic or non-metallic containers could be used as the final packaging container provided that the structural character of such containers is compatible with the level of pressure created by post-packaging $CO_2$ emission. Such containers can be of a wide variety of description including rigid as well as non-rigid or flexible type structures and be made of various effective gas barrier materials including fibers, foils, plastics and combinations thereof. However, subsequent to packaging, such containers should not be subjected to pressures significantly above atmospheric pressure by the $CO_2$ remaining in the coffee at the time of packaging.

In the removal of $CO_2$ to facilitate packaging, in order to preserve the full flavor of the coffee, it is important to prevent loss of significant amounts of the aroma and flavor-giving constituents. Thus if it were suggested to condition the coffee in a high degree of vacuum of, for example 10 mm. Hg to promote accelerated evolution of $CO_2$ gas, many of the aroma and flavor-giving coffee constituents would be lost since the vapor pressures of the majority of these constituents is above 10 mm. Hg but below 500 mm. Hg at an ambient temperature of 20° C.

It is known to process coffee to remove $CO_2$ therefrom by allowing the $CO_2$ to evolve in an environment at sub-atmospheric pressure, i.e., the vapor pressure of the coffee. Such a process is described in U.S. Patent 3,333,963. According to the process described in that patent, freshly roasted coffee is placed in a conditioning chamber, the pressure in the chamber is reduced to the vapor pressure of coffee (about 500 mm. Hg), inert gas is admitted to displace oxygen from the container until container pressure reaches a positive pressure above atmospheric after which the pressure in the container is again reduced to the vapor pressure of coffee and is maintained for a time to allow $CO_2$ evolution to proceed. Processing of coffee in accordance with the teaching of this patent renders the coffee amenable to packaging in flexible packages and similar containers not designed to withstand pressures appreciably above atmospheric pressure. The conditioning of coffee according to the aforementioned patent occurs on a step by step basis involving first an evacuation of $CO_2$ from the container followed by admission of inert gas until the container pressure is above atmospheric level. In this processing then the function of the inert gas is solely protective, i.e., to prevent oxidation of the coffee. Furthermore, $CO_2$ is evacuated principally from the headspace of the container whereas it is at the bottom of the container where the greatest concentration of $CO_2$ exists and therefore less than optimum removal of $CO_2$ is achieved. Also, admission of protective inert gas is accomplished as a separate processing step during which time no removal of $CO_2$ gas is possible. While this processing is effective, it involves processing steps which are to an extent lengthy. Moreover, conditioning coffee according to the aforementioned patent occurs in such manner as to allow before evacuation substantial concentration of $CO_2$ gas to accumulate in the headspace of the container and in the interstitial spaces between particles of coffee. A high concentration of $CO_2$ gas in the interstitial spaces between particles of coffee and in the headspace of the container can slow the diffusion rate at which the $CO_2$ leaves the coffee cells thereby prolonging the time required to reduce the $CO_2$ contained by the coffee to the required level.

On the other hand, it has been found since and in accordance with the present invention that coffee may be conditioned to remove $CO_2$ therefrom at a more accelerated rate than is possible with the process of the aforementioned patent and in a manner that more completely removes $CO_2$ gas from the processing container during the times the container is being evacuated.

SUMMARY OF THE INVENTION

The present invention relates to the conditioning and packaging of freshly roasted coffee, and particularly to a method and means with which removal of the carbon dioxide gas generated in the cells of the coffee as an incident of roasting is accelerated, the removal of the $CO_2$ being effected without detriment to the natural flavor and aroma qualities of the coffee, the $CO_2$ removal occurring under conditions of regulated evacuation of the conditioning container.

According to the present invention, freshly roasted coffee is delivered into a conditioning container from which processing gas including CO₂ evolving from the coffee is removed or evacuated from the container while at the same time protective and purging inert gas is supplied to the container. The rate of flow of inert gas into and the rate of flow of processing gas out of the chamber is regulated such that the pressure therein is maintained sub-atmospheric but yet above the vapor pressures of at least the majority of the volatile constituents of the coffee. The coffee is conditioned in the chamber until the desired amount of occluded CO₂ has evolved from the cells of the coffee. When the freshly roasted coffee is to be packaged in a lightweight metal can, a fiber container or a flexible package, and is in the form of coffee beans, the coffee may be conditioned in the chamber for a period of up to about four to five days, while if the freshly roasted coffee is ground before being fed into the chamber the period of conditioning may be about two to five hours.

Prior to the discharge of conditioned coffee from the chamber, the pressure in the chamber is raised to or above atmospheric pressure by the admission of additional inert gas and this pressure is maintained during discharge of coffee from the chamber in order to assist such discharge. The discharged coffee preferably is packed in an atmosphere of an inert gas in an airtight container.

The invention further provides apparatus for conditioning freshly roasted coffee and includes a gas-tight container in which the coffee is conditioned, suitable means for evacuating gas from the container and for feeding an inert gas into the container and control means for controlling the rate of flow of inert gas into and processing gas out of the container while maintaining pressure in the container in a predetermined sub-atmospheric pressure range above the vapor pressures of at least the majority of the volatile constituents of the coffee.

The invention accordingly comprises the several steps and the relation of one or more of such steps with respect to each of the others, and the apparatus embodying features of construction, combinations of elements and arrangements of parts which are adapted to effect such steps, all as exemplified in the following detailed disclosure, and the scope of the invention will be indicated in the claims.

BRIEF DESCRIPTION OF THE DRAWINGS

The invention and a fuller understanding of its nature and objects will appear more clearly from the following detailed description taken in conjunction with the accompanying drawings showing by way of example preferred embodiments of the inventive concept and in which:

FIGURE 1 is a diagrammatic illustration of apparatus with which coffee may be conditioned in accordance with the present invention.

FIGURE 3 is a gas emission chart illustrating the rate of CO₂ evolution from a coffee blend conditioned at two different operating pressure ranges and gives visual depiction of the reduction in conditioning times possible by operating at different pressures according to the present invention.

FIGURE 4 is a chart similar to that shown in FIGURE 3 and depicts the effect the degree of roast has on conditioning time.

Throughout the description like reference numerals are used to denote like parts in the drawings.

DESCRIPTION OF THE PREFERRED EMBODIMENTS

Figure 2:
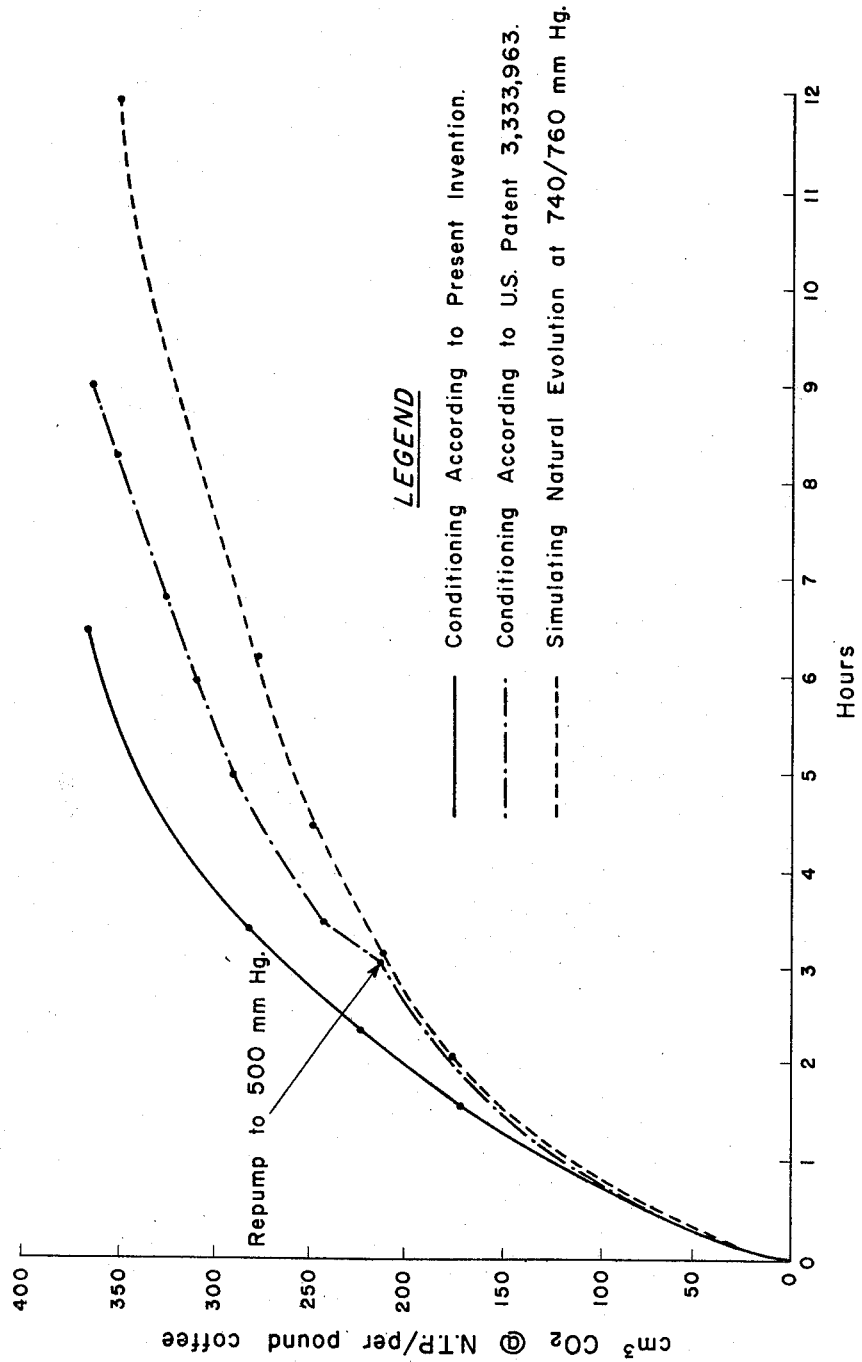
FIGURE 2 is a gas emission graph illustrating the accelerated rate at which CO₂ gas can be evolved with the process of the present invention as compared with the gas evolution rate possible when conditioning coffee by simulated natural evolution as well as processing according to U.S. Patent 3,333,963.

The present invention is concerned with a process and apparatus with which coffee can be conditioned to accelerate the evolution or liberation of CO₂ gas which is generated in the cells of the coffee as a consequence of roasting, to the extent that the coffee can be packaged in lightweight metal cans, fiber containers or flexible packages. Generally and preferably this involves reducing the pressure of residual CO₂ gas in the coffee cells to a desired pressure level or value which is not substantially above atmospheric pressure, but more specifically a pressure level compatible with the structural character of the container. Thus the fiber container or flexible package can be readily hermetically sealed but need not be designed to withstand any substantial buildup of internal gas pressure therein substantially above atmospheric pressure since post-packaging CO₂ gas emission as a packaging problem is substantially reduced or eliminated by conditioning of coffee in accordance with the process and apparatus of the present invention. Moreover, the processing of coffee according to the present invention is carried out under such conditions and manner that the coffee is protected from oxidation of the flavor and aroma-giving constituents thereof which if exposed to oxygen before or during packaging contributes to staling of the coffee.

It is well known that freshly roasted coffee whether in whole bean or granular form gives off CO₂ gas for some time following roasting. This CO₂ gas must be allowed to evolve from the coffee to facilitate packaging. Although CO₂ may have some preservative character, it is essentially a waste product and contributes little if anything to the flavor and aroma of coffe. The roasted coffee also contains other volatile constituents. Certain of these constituents such as acetaldehyde, ammonia, furan, methylamine, methyl mercaptan, hydrogen sulphide, formaldehyde and trimethylamine and which represent a minority of the overall constituent makeup of coffee, have questionable if any worthwhile effect in giving roasted coffee flavor and aroma. These last-mentioned constituents are more volatile than the main flavor and aroma-giving constituents and have vapor pressures at 20° C. in excess of about 500 mm. Hg whereas the remaining and flavor and aroma-producing constituents of coffee (hereinafter referred to for convenience as the majority of coffee volatile constituents) have vapor pressures below 500 mm. Hg at 20° C. and of these the preponderant number have vapor pressures below 300 mm. Hg at 20° C. The present invention makes use of the foregoing to accelerate evolution of CO₂ gas from freshly roasted coffee by conditioning the coffee in a chamber maintained at a sub-atmospheric pressure in a range above the vapor pressures of a majority of the volatile constituents of coffee. Reference herein to the vapor pressures of the majority of the volatile constituents of coffee and the vapor pressures of the preponderant number of the majority of the volatile constituents of coffee as being below 500 and 300 mm. Hg, respectively, is intended to apply to freshly roasted coffee being conditioned at an ambient temperature of 20° C. Obviously if the ambient conditioning temperature was higher or lower than 20° C., the vapor pressures of the majority of the volatile constituents of coffee and of the preponderant number of the majority of the volatile constituents would accordingly change to some higher or lower value above or below 500 and 300 mm. Hg respectively. Thus, the conditioning of coffee in accordance with the present invention can take place at various sub-atmospheric pressure levels depending upon the value of the vapor pressures of the majority of volatile constituents of coffee and the preponderant number of the majority of the volatile constituents of coffee for given temperature conditions. The vapor pressures of some of the various coffee volatile constituents at 20° C. are shown in the following table.

Substances with vapour pressures below 500 mm. Hg at 20° C.

Hydrocarbons
   n-Heptacosane _____ 0.05

Hydrocarbons
  Isoprene _____ 440
  Toluene _____ 22
  Naphthalene _____ 0.06
  Myrcene _____ Below 20
  Limonene _____ Below 20
  Styrene _____ Below 20
  p-Cymene _____ Below 20
  p-Isopropenyltoluene _____ Below 20
  1,2,4-trimethylbenzene _____ Below 20
  1,2,4,5-tetramethylbenzene _____ Below 20
  Biphenyl _____ Below 20
  3-methylbiphenyl _____ Below 20
  1-methylnaphthalene _____ Below 20
  Dimethylnaphthalenes (mixed) _____ Below 20
  2-ethylnaphthalene _____ Below 20
  Trimethylnaphthalenes (mixed) _____ Below 20
  Indene _____ Below 20
  Fluorene _____ Below 20

Alcohols and ethers
  Methanol _____ 96
  Ethanol _____ 47
  Isopropanol _____ 32
  Isobutanol _____ 24
  n-Pentanol _____ Below 20
  3-methylbutan-1-ol _____ Below 20
  Heptan-2-ol _____ Below 20
  n-Hexanol _____ Below 20
  Octan-3-ol _____ Below 20
  3-methyl-(2-butene)-1-ol _____ Below 20
  1-octene-3-ol _____ Below 20
  Linalol _____ Below 20
  3,4-dimethoxystyrene _____ Below 20
  a-Terpineol _____ Below 20

Aldehydes
  Propanal _____ 276
  n-Butanal _____ 133
  Isobutanal _____ 134
  Isopentanal _____ 43
  2-methylbutanal _____ 43
  n-Hexanal _____ Below 30
  2-methylbut-2-enal _____ Below 30
  Benzaldehyde _____ Below 20
  O-tolualdehyde _____ Below 20
  Salicylaldehyde _____ Below 20
  Phenylacetaldehyde _____ Below 20
  3-methyl-2-butenal _____ 25

Ketones
  Acetone _____ 131
  2-butanone _____ 72
  2-pentanone _____ 55
  3-pentanone _____ 55
  3-hexanone _____ Below 30
  2-heptanone _____ Below 20
  2-octanone _____ Below 20
  3-octanone _____ Below 20
  2-nonanone _____ Below 20
  2-decanone _____ Below 20
  2-undecanone _____ Below 20
  2-tridecanone _____ Below 20
  Cyclopentanone _____ Below 30
  Mesityl oxide _____ Below 30
  6,10-dimethylundecanone-2 _____ Below 20
  6,10,14-trimethylpentadecanone-2 _____ Below 20
  Propiophenone _____ Below 20
  Pent-3-ene-2-one _____ Below 30

Ketonic Alcohols
  Propan-1-ol-2-one _____ Below 20
  Butane-2-ol-3-one _____ Below 20
  Butan-2-ol-3-one _____ Below 20
  Pentan-2-ol-3-one _____ Below 20
  Pentan-3-ol-2-one _____ Below 20

Diketones
  Butane-2,3-dione _____ 84
  Pentane-2,3-dione _____ 50
  Hexane-2,3-dione _____ 31
  4-methylpentane-2,3-dione _____ 31
  5-methylhexane-2,3-dione _____ Below 30
  Octane-2,3-dione _____ Below 20
  Hexane-3,4-dione _____ Below 40
  Heptane-3,4-dione _____ Below 30
  1-phenylpropane-1,2-dione _____ Below 20
  3,4-dimethylcyclopentane-1,2-dione _____ 0.5
  3,5-dimethylcyclopentane-1,2-dione _____ 1.2
  3-ethylcyclopentane-1,2-dione _____ca__ .1
  3-methylcyclohexane-1,2-dione (M.P. 62°) Below 1
  1-(2'-furyl)-butane-1,2-dione _____ Below 1
  1-[(5'-methyl)-2'-furyl]-propane-1,2-dione
                                            Below 1
  Hexane-2-,5-dione _____ Below 20
  Hepane-2-,5-dione _____ Below 20

Acids and Anhydrides
  Formic acid _____ 33
  Acetic acid _____ 11.8
  Propionic acid _____ Below 10
  Isovaleric acid _____ Below 10
  n-Valeric acid _____ Below 10
  2-methylbutyric acid _____ Below 10
  Hexanoic acid _____ Below 10
  Isobutyric acid _____ Below 10
  Senecioic (ββ-dimethylacrylic) acid _____ Below 10
  Dimethylmaleic anhydride _____ Below 10
  Ethylmethylmaleic anhydride _____ Below 10
  Methacrylic acid _____ Below 10
  Crotonic acid _____ Below 10
  Tiglic acid _____ Below 10
  Methylmaleic anhydride _____ Below 10

Esters and Lactones
  Methyl formate _____ 476
  Methyl acetate _____ 170
  Methyl palmitate _____ Below 1
  Methyl benzoate _____ Below 1
  Benzyl formate _____ Below 1
  y-Butyrolactone _____ Below 1
  Crotonolactone _____ Below 1
  Acetol acetate _____ Below 20
  Butan-2-one-1-yl acetate _____ Below 20
  Methyl nicotinate _____ Below 20
  Isopropyl formate _____ 146
  Isoamyl acetate _____ 21
  Methyl phenylacetate _____ Below 10

Phenols
  Phenol _____ 5
  o-Cresol _____ Below 5
  m-Cresol _____ Below 5
  2,3-xylenol _____ Below 5
  2,5-xylenol _____ Below 5
  2,6-xylenol _____ Below 5
  3,4-xylenol _____ Below 5
  2-ethylphenol _____ Below 5
  2,3,5-trimethylphenol _____ Below 5
  Guaiacol _____ Below 5
  4-ethylguaiacol _____ Below 5
  4-vinylguaiacol _____ Below 5
  0-hydroxyacetophenone _____ Below 5
  2,3-dihydroxyacetophenone (M.P. 97/8°) Below 5
  2-hydroxy-5-methyl-acetophenone _____ Below 5
  Methyl salicylate _____ Below 10

Furans
  2-methylfuran _____ 227
  Tetrahydrofuran _____ 227

Furans
- 2-methyltetrahydrofuran --- 122
- 2-pentylfuran --- Under 10
- 2-phenylfuran --- Under 10
- 2,5-dimethylfuran --- 99
- Propylfuran --- 52
- Bi-(2-furyl)-methane --- Under 10
- 5'-methyl-bi-(2-furyl)-methane --- Under 10
- Bi-(5'-methyl-2-furyl) methane --- Under 10
- Benzofuran --- Under 10
- 2,3-dihydrobenzofuran --- Under 10
- 2-methylbenzofuran --- Under 10
- Furfuryl alcohol --- Under 10
- Furfuryl methyl ether --- Under 20
- Di-2-furfuryl ether --- Under 10
- 5'-methyl-di-furfuryl ether --- Under 10
- Furfuraldehyde --- 14
- 5-methylfurfuraldehyde --- Under 10
- 2-acetylfuran --- Under 10
- 2-propionylfuran --- Under 10
- 2-butyrylfuran --- Under 10
- 2-acetyl-5-methyl-furan --- Under 10
- 2-propionyl-5-methylfuran --- Under 10
- 2-furylacetone --- Under 20
- 2-(5-methylfuryl)-acetone --- Under 20
- 2-furylmethyl ethyl ketone --- Under 20
- 2-(5-methylfuryl)-methyl ethyl ketone --- Under 20
- 2-(3'-furylethyl) methyl ketone --- Under 20
- 2-(2'-[5-methylfuryl] ethyl methyl ketone --- Under 20
- Furfuryl formate --- Under 20
- Furfuryl acetate --- Under 10
- Furfuryl propionate --- Under 10
- Furfuryl butyrate --- Under 10
- Furfuryl isobutyrate --- Under 10
- Furfuryl isovalerate --- Under 10
- Furfuryl 2-methylbutyrate --- Under 10
- Furfuryl crotonate --- Under 10
- Furfuryl ββ-dimethylacrylate --- Under 10
- Furfuryl mercaptan --- 19
- Furfuryl methyl sulphide --- 7
- 5-methylfurfuryl methyl sulphide --- Under 10
- Di-(2-furfuryl)-sulphide --- Under 10
- 2-(5-methylfuryl) methyl sulphide --- 7
- Methyl 2-furylthiolcarboxylate --- Under 10
- Methyl 2-furfurylthiolcarboxylate --- Under 10
- 2-furfuryloxyacetone --- Under 20
- 4-(2'-furyl)-but-3-ene-2-one --- Under 20

Thiophenes
- Thiophene --- 104
- 4-ethyl-2-methyl-thiophene --- 96
- Benzo [b]thiophene --- Below 10
- Thiophthene --- Below 10
- 2-thienylmethanol --- Below 10
- 2-formylthiophene --- Below 20
- 2-formyl-5-methylthiophene --- Below 20
- 2-acetylthiophene --- Below 20
- 3-acetylthiophene --- Below 20
- 2-acetyl-3-methylthiophene --- Below 20
- 2-acetyl-4-methylthiophene --- Below 20
- 2-acetyl-5-methylthiophene --- Below 20
- 2-propionylthiophene --- Below 20
- 1-(2'-thienyl)-propane-1,2-dione --- Below 20
- 2-thienyl-methyl formate --- 17
- 2-thienyl-methyl acetate --- Below 17
- Methyl 2-thienylcarboxylate --- Below 20
- 1-(3'-thienyl)-propane-1,2-dione --- Below 20

Pyrroles
- Pyrrole --- 27
- N-methylpyrrole --- 41
- N-isoamylpyrrole --- Below 10
- N-(2'-methylbutyl)-pyrrole --- Below 10
- 2-formylpyrrole --- Below 10
- N-(2'-furfuryl)-pyrrole --- Below 10
- N-(2'-[methylfurfuryl])-pyrrole --- Below 10
- N-methyl-2-formylpyrrole --- Below 10
- N-ethyl-2-formylpyrrole --- Below 10
- N-(2'-furfuryl)-2-formylpyrrole --- Below 10
- N-methyl-2-acetylpyrrole --- Below 10
- N-(2'-furfuryl)-2-acetylpyrrole --- Below 10
- N-isoamyl-2-formylpyrrole --- Below 10
- N-isoamyl-2-formylpyrrole --- Below 10
- 1-(2'-pyrryl)-butane-1,2-dione --- Below 10

Thiazoles
- 2-acetyl-4-methylthiazole --- Below 20
- 2-propionyl-4-methylthiazole --- Below 20

Miscellaneous
- Pyridine --- 39
- Maltol --- Below 1
- Propenenitrile --- 122
- Catechol --- 1.5
- m-Creosol --- Below 10
- Resorcinol --- Below 1
- 2-methyltetrahydrofuran-3-one --- Below 30
- Tetrahydrothiophene-3-one --- Below 40
- 2-methyl-tetrahydrothiophen-3-one --- Below 40
- cis-Linalol oxide --- Below 20
- trans-Linalol oxide --- Below 20
- Anhydro-linalol oxide --- Below 30
- 5-acetyl-2-methyl-oxazole --- Below 30
- N,a-dimethylsuccinimide --- Below 30

Pyrazines
- Pyrazine --- 40
- 2-methylpyrazine --- 25
- 2,3-dimethylpyrazine --- 16
- 2,5-dimethylpyrazine --- 16
- 2,6-dimethylpyrazine --- 16
- 2-ethylpyrazine --- 16
- 2-propylpyrazine --- Below 16
- 2,3,5-trimethylpyrazine --- Below 16
- 2-ethyl-3-methylpyrazine --- Below 16
- 2-ethyl-5-methylpyrazine --- 9
- 2-ethyl-6-methylpyrazine --- Below 10
- 2-methyl-5-isopropylpyrazine --- Below 10
- 2-methyl-6-propylpyrazine --- Below 10
- 2,5-diethylpyrazine --- Below 10
- 2,6-diethylpyrazine --- Below 10
- 2-isobutyl-3-methylpyrazine --- Below 10
- 2-ethyl-3,5-dimethylpyrazine --- Below 10
- 3-ethyl-2,5-dimethylpyrazine --- Below 10
- 2-vinylpyrazine --- Below 20
- 2-methyl-5-vinylpyrazine --- Below 10
- 2-methyl-6-vinylpyrazine --- Below 10
- 5-methylquinoxaline --- Below 10
- α-Picoline --- Below 30
- β-Picoline --- Below 30
- β-Ethylpyridine --- Below 30

Mercaptans and sulphides (additional)
- Dimethyl sulphide --- 16
- Ethyl methyl sulphide --- Below 20
- Carbon disulphide --- 298
- 1-methylthiobutan-2-one --- Below 20
- Thioanisole --- Below 20
- 2-hydroxythioanisole --- Below 20

As will be discerned by further reading of this specification pressures at which the coffee is conditioned can include pressures which are below the levels of the vapor pressures of some of the flavor and aroma-giving constituents of coffee. However, in those cases, loss of certain volatiles is accepted since their absence from the ultimate product does not produce coffee with unacceptable flavor and aroma. For example, it is within contemplation of the teaching of the present invention that coffee can be conditioned at an ambient temperature of 20° C. under conditions wherein loss of coffee volatiles having vapor pressures in a range from 300 to 500 mm. Hg. is acceptable in that flavor and aroma qualties are still essentially those of acceptable tasting coffee.

As used in the following description "processing gas" is intended to describe a gaseous medium comprised of carbon dioxide ($CO_2$) evolving from the cells of freshly roasted coffee, protective inert gas present within the conditioning chamber and supplied thereto in the manner as will appear later, and traces of such other constituents of coffee as volatilize above the vapor pressures of the majority of volatile constituents of coffee. "Inert Gas" is intended to mean an inert type gas, preferably nitrogen, supplied to the processing container during the course of processing to purge it free of any traces of oxygen, and to prevent oxidation of the freshly roasted coffee, and also to purge $CO_2$ from the processing container.

Description will be given first of the apparatus with which freshly roasted coffee can be processed in accordance with the present invention. As seen in FIGURE 1, the apparatus includes a large generally upright container 1 preferably of cylindrical shape and having a conical bottom section as at 1b, the container being constructed with sufficient integrity to allow the interior thereof normally to be evacuated to sub-atmospheric pressures in a range down to at least 300 mm. Hg. The overall dimensions of the container 1 will generally be such as to provide batch processing of coffee in weights up to several tons at one time. In general and as will appear, bin size and conditioning pressures have practical limitations. For example, a large bin size coupled with a very low conditioning pressure of say 100 mm. Hg would require a relatively large vacuum pump and prolonged evacuation period to reduce pressure within the bin to 100 mm. Hg. Moreover, existing equipment could not be adapted readily to the practice of the present invention if an operating pressure of such low value were to be employed.

The interior of the container 1 provides a chamber or environmental space wherein freshly roasted coffee is conditioned. Filling of the container with coffee is accomplished by delivering coffee thereto through a funnel 3 which preferably connects directly with the roasting and/or grinding equipment, the funnel terminating at the top of container 1 at closeable port 2, the latter being a hermetically sealable closure member. The container 1 is also provided with a discharge port 6 at the bottom thereof through which conditioned coffee is discharged for packaging. Located within container 1 adjacent the bottom thereof is a suction filter 5 preferably provided in the form of a cone and connected to suction piping 4 extending outwardly of the container to the exhaust pumping unit and associated valving hereinafter described. Also located in the container 1 near the top thereof is an inlet or dispersion head 7 through which inert gas can be admitted to the container, the dispersion head having connection with gas feed line 8. It will be understood that dispersion head 7 is provided so as to introduce the inert gas to the container over an expanse therein rather than in a single jet and in this manner accomplish introduction with a relatively non-turbulent flow during the conditioning so as to minimize mixing of the inert gas with the $CO_2$ present in the container.

Conditioning of coffee preferably occurs under substantially automatically controlled conditions and for that purpose the apparatus includes various other devices including magnetic control valves 17 and 18 for controlling flow through feed line 8 and suction line 4 respectively. Suitable flow rate indicators 19 and 20 as well as fine adjustment valves 13 and 10 are provided for the feed line 8 and suction line 4 in the manner illustrated. As will appear later herein it is advantageous to have capability of isolating completely either the gas feed line 8 or suction line 4 from the interior of the container or to cross connect these conduits and for that purpose isolation valves 14 and 9 are provided as shown. A vacuum pump unit 11 is provided for exhausting the interior of the container 1 to an initial sub-atmospheric pressure level for conditioning in the manner as will appear, and also a source 12 of inert gas such as a bank of pressurized nitrogen gas cylinders is provided for supplying inert gas to the container during conditioning. The inert gas may be stored in source 12 at high pressure, for example, 2000 p.s.i.g., a reducer valve 31 being provided to reduce the pressure of the inert gas when introducing such gas into the container 1 in the manner and for the purposes to be described hereinafter. A pressure gauge 15 for recording pressure in the container 1 is provided and is connected with a pressure switch unit 16 which in turn controls operation of the magnetic valves 17 and 18.

In conditioning coffee according to the present invention, utilization is made of the existence of a differential of pressure between the occluded gas in the coffee cell and that in the conditioning container. An initial sub-atmospheric pressure level of some measure below 760 mm. Hg is preferred and preferably is at least 500 mm. Hg (considered for ambient temperature of 20° C.) or lower provided of course it does not go below the vapor pressures of a majority of the volatile constituents of coffee. The existence of this pressure differential is very important. As the pressure of the $CO_2$ gas in the coffee cells reduces and approaches atmospheric level, a prolonged time is required to establish equilibrium. Thus operating at an initial sub-atmospheric pressure level above 700 mm. Hg is not desirable.

An important feature of the present invention provides that during the time $CO_2$ gas is being evacuated from the container inert gas is admitted thereto not only to protect the coffee from contact by spurious traces of oxygen in the container but also to act to purge the container of $CO_2$ gas in conjunction with the action of the vacuum pump in removing $CO_2$ gas. The inflow of inert gas to the container commences at the time the pressure level in the container is raised from the initial sub-atmospheric pressure level to a predetermined higher sub-atmospheric pressure level by the $CO_2$ gas evolving from the coffee. Its rate of inflow is almost equal to the rate at which $CO_2$ gas is being drawn from the container. In time, however, the suction rate overcomes the inflow rate of the inert gas and lowers the pressure within the container to the initial sub-atmospheric level.

Further understanding of the invention will be had by description of the process in which freshly roasted coffee is conditioned to remove $CO_2$ gas therefrom. As a preliminary to commencing conditioning, it is preferable though not essential that the interior of container 1 be evacuated to remove any air present within the container down to a presence of oxygen therein of approximately 1%. This can be done by evacuating container 1 in an empty condition to remove oxygen followed by flushing out with inert gas. This cycle of evacuation plus flushing can be repeated as often as necessary until the reduction of oxygen to approximately 1% content is achieved. For example, evacuation of an empty container to a pressure of substantially 500 mm. Hg, followed by a flush with nitrogen back to atmospheric pressure of 760 mm. Hg, requires seven additional evacuation-flush cycles to bring the oxygen content therein down to the required level. As will appear later, conditioning of coffee according to the present invention occurs in such manner that as a consequence of the technique employed in discharging coffee from the container the interior of the latter will be almost exclusively an inert gas atmosphere so that the foregoing described oxygen removal procedure need not be repeated after system startup.

Turning once again to the conditioning sequence, the container 1 is now charged with a flood feed of coffee through funnel 3 with the coffee itself providing a baffle above the open charging port 2 to thereby aid in resisting the entry of atmospheric air into the container. In general, container 1 can be filled with coffee to a point just below the inert gas dispersion head with the quantity of coffee being regulated in known manner as by feeding in a predetermined weight although it is preferred to provide a level control in the container which closes port 2 automatically as soon as the required amount of coffee has been charged into the container.

With freshly roasted coffee now present in the evacuated container 1, removal of $CO_2$ gas which is evolving from the coffee beans or the granules if the coffee is ground will proceed at accelerated rate and under controlled conditions. As was mentioned earlier, processing will be at some pressure below atmospheric but not below the vapor pressures of the majority of the volatile constituents of coffee. For an ambient temperature condition of 20° C., a convenient initial sub-atmospheric pressure level is 500 mm. Hg and the further description given is for processing at that pressure although it will be understood that acceptable coffee flavor and aroma can be achieved at other lower initial sub-atmospheric pressure levels. Pressure switch 16 normally is designed to operate (open) magnetic valves 17 and 18 at a higher sub-atmospheric pressure level condition within container 1 which is a predetermined level above the initial sub-atmospheric pressure level. This predetermined level is desirably in the range of 10 to 25 mm. Hg above the initial sub-atmospheric pressure level, i.e., 510 to 525 mm. Hg, although a larger differential of pressure between the initial and higher sub-atmospheric pressure levels is possible, as for example, a differential of 100 mm. Hg. However, use of a greater differential is better avoided since larger concentrations of $CO_2$ are thereby permitted to occur in the container with concomitant lengthening of the time required for proper $CO_2$ gas evolution. Thus, as soon as the $CO_2$ gas evolving from the freshly roasted coffee raises the pressure level in the container 1 to the higher sub-atmospheric pressure level, valves 17 and 18 will open and processing gas (principally $CO_2$ gas) will be evacuated from container 1 while protective inert gas will be supplied thereto. Under these conditions both isolation valves 14 and 9 will be closed. Simultaneous evacuation of processing gas from and supply of inert gas to container 1 will occur until the pressure within the container reduces to the initial sub-atmospheric pressure level of 500 mm. Hg at which point pressure switch 16 operates to close magnetic valves 17 and 18 to prevent further reduction of the pressure within the container below said initial pressure level. In evacuating the processing gas from container 1, the outflow of same is adjusted to be at a slightly greater rate than inert gas is flowing into the container. The volume of inert gas entering the container is generally such as to insure that when the pressure in the latter reaches 500 mm. Hg, the atmosphere in the interstitial spaces of the coffee has been substantially purged of $CO_2$ gas emitted from the coffee cells. Thus there is always occurring during the evacuation part of the processing cycle, a positive removal of evolving $CO_2$ gas. When the container initial sub-atmospheric pressure level of 500 mm. Hg is reached and magnetic valves 17 and 18 close, $CO_2$ gas continues to evolve from the cells of the coffee and gradually again builds up the container internal pressure to the higher sub-atmospheric pressure level of 510 to 525 mm. Hg, at which level pressure switch 16 operates to open the magnetic valves to renew the evacuation and inert gas entry operation. During the time the container internal pressure is allowed to rise from 500 to 510 to 525 mm. Hg, the $CO_2$ gas concentration within the container also increases with the region of greatest concentration being that at the bottom of the container. It is for this reason, and is an important feature of the present invention, that suction filter 5 is placed at the bottom of the container at the location of the greatest concentration of $CO_2$ gas so as to enable positive and rapid removal of the $CO_2$ gas from the container. Another important feature of the present invention as indicated earlier, is that inert gas admitted during the evacuation portion of the operating cycle not only protects the coffee but it assists in removal of $CO_2$ gas from the container by providing purging action operating in conjunction with the vacuum pump to provide more positive $CO_2$ gas removal from the container.

The conditioning now continues on a cyclic basis under control of the pressure switch 16 until the pressure of occluded $CO_2$ gas in the cells of the coffee has been reduced to the desired extent compatible with the structural character of the container in which it is to be finally packaged. The foregoing can be determined readily by sampling the $CO_2$ gas content of the processing gas being removed from the container. The time needed for the process will vary according to the degree of roast and the fineness of the grind of coffee being conditioned as well as the pressure level to which it is desired to reduce the gas within the coffee cells, such desired pressure level being one compatible with the structural character of the final package in which the conditioned coffee is packed.

It is advantageous but not essential at the end of the process of removing $CO_2$ gas from the coffee to isolate pressure control switch 16 and by opening isolation valve 14 thereby orient the system to deliver pressurized inert gas to the container 1 through suction filter 5 until the pressure within the container rises to slightly above one atmosphere to guarantee air exclusion from the container. The coffee is then ready for discharge by opening discharge port 6 to the final packing machines with the coffee being conveyed from the conditioning container to the packing machines through an enclosed system in which exposure to atmospheric oxygen in minimal. The packing machine 40 shown schematically in FIGURE 1 is illustrative of one type of packing apparatus which can be employed, and can include a roll 41 supplying flexible packing material to the machine. The pack is filled with coffee and the individual packages 42 leave the machine after being filled with protective nitrogen supplied by line 43. Optionally, the coffee may be stored in the inert gas flushed conditioning container for a period of time and until required for packing as, for example, when the packing plant is closed such as on weekends and public holidays. Thus, the conditioned coffee is then available for discharge and packing immediately on the resumption of work at the packing facility, the coffee having been conditioned and stored under such procedures as insure that no staleness or other detrimental changes occur in the coffee during the interval between roasting and packing.

During the discharge of coffee from the processing container 1, the pressure of the inert gas supplied to the container can be raised to about 5 p.s.i.g. and be used to supplement the effect of gravity in the discharge of the coffee as well as to resist intake of air to the container. During the coffee discharge the inert gas preferably is supplied to the container at the base of the container through the suction filter 5 rather than through the feed line 8 since the introduction of inert gas at this point not only assists discharge of the coffee but also clears the suction filter of coffee particles sucked in during the earlier suction operations. The foregoing is easily provided by closing isolation valve 9 and opening isolation valve 14 during the coffee discharge procedure. Once the container is empty of coffee the discharge port 6 may be closed when the atmosphere in the conditioning container is predominantly nitrogen thereby readying the container for receiving a new charge of roasted coffee at the initiation of a new cycle of processing.

The advantages of conditioning coffee in accordance with the present invention can be seen by reference to FIGURE 2 which is a gas emission chart graphically depicting comparative conditioning times for $CO_2$ removal from the batches of coffee in accordance with the present invention at pressures of 500/520 mm. Hg, by simulated natural evolution at atmospheric pressure, and at about 500 mm. Hg in accordance with the prescriptive teaching of U.S. Patent 3,333,963 respectively. The test batches each were sixty pounds of a high quality coffee blend, comprised of Columbian, New Guinean, Costa Rican, Bugisu, Extra Prime Santos and Uganda Robusta coffees. The batches were medium grind, having an analysis of:

| Sieve size: | Percent |
|---|---|
| 10 | 0.5 |
| 16 | 43.75 |
| 22 | 33.5 |
| 30 | 13.25 |
| 44 | 8.0 |
| Base | 1.0 |

Conditioning was at an ambient temperature of 20° C. Time zero on the chart denotes the time one hour after the start of grinding, such interval of one hour being the period required in the production plant for the grinding operation, conveyance to and complete filling of the conditioning hopper. In conditioning according to U.S. Patent 3,333,963 the conditioning chamber was evacuated down to a pressure of 500 mm. Hg at the start of conditioning. The evolution of $CO_2$ from the coffee was then allowed to proceed without further evacuation of the conditioning chamber until a lapse of three hours from time zero when a second exacuation to remove $CO_2$ gas returned the pressure level in the container down to 500 mm. Hg. Since measurement of gas evolution by natural evolution of $CO_2$ would be difficult to record, a simulated natural evolution was used wherein the coffee batch was placed in container 1 and the container evacuated to a pressure of 740 mm. Hg at which pressure evacuation was stopped. When the $CO_2$ gas evolving from the coffee raised the pressure to an atmospheric level of 760 mm. Hg evacuation of the container was renewed until the pressure therein was brought back down to 140 mm. Hg. This cycle was then repeated as required to maintain the container pressure in the 740/760 mm. Hg range. During the simulated natural evolution conditioning, no nitrogen purge was employed during actual evacuation of gas from container 1. The $CO_2$ emission has been plotted as cubic centimeters of gas per pound of coffee evolving per unit of time commencing at time zero, and as such does not take into account the $CO_2$ which evolves from the coffee during the one-hour interval between start of the grinding operation and the commencement of conditioning. As can be noted from FIGURE 2, the gas emission rate for all three batches is very nearly equal during the first hour of conditioning. However, after that time, the emission rate starts to fall off quite rapidly for both simulated natural evolution at atmospheric pressure and conditioning according to Patent 3,333,963. The chart illustrates quite graphically the reduction in conditioning time which can be achieved with the present invention. Thus, if the package structure in which the coffee is to be packaged requires that the $CO_2$ gas pressure in the coffee be reduced to a certain desired pressure level with which is associated the removal of 300 cubic centimeters of $CO_2$ gas therefrom per pound of coffee, this can be accomplished in about 3¾ hours of conditioning in accordance with the present invention. On the other hand, conditioning to remove a comparable quantity of gas by conditioning in accordance with Patent 3,333,963 takes about 5½ hours and by simulated natural evolution about 7½ hours. As can be discerned, if the structural character of the ultimate final package is such as to require removal of a greater quantity of $CO_2$ gas from each pound of the coffee, as for example, 350 cubic centimeters, conditioning time increases with all conditioning techniques, becoming about 5½ hours when conditioning in accordance with the present invention. However, conditioning according to Patent 3,333,963 takes about 8¼ hours; whereas conditioning by simulated natural evolution requires almost 12 hours. FIGURE 2 further illustrates the increasing effectiveness of conditioning of the coffee according to the present invention in comparison to the other conditioning techniques as the pressure of the $CO_2$ remaining in the cells of the coffee reduces. It is believed apparent that the very measurable reduction in coffee conditioning time possible with the method of the present invention represents a significant economic advantage in coffee conditioning.

The time for conditioning coffee in accordance with the present invention to remove $CO_2$ therefrom will of course vary to an extent upon the degree of roast given the coffee. Generally, though, when the freshly roasted coffee is in the form of whole beans the coffee may be conditioned in the chamber for a period of up to about four to five days before $CO_2$ removal consonant with that acceptable for the intended packaging is achieved, while if the freshly roasted coffee is ground before being fed into the chamber the period of conditioning may be from two to five hours. FIGURE 4 is a gas emission chart illustrating conditioning two samples of coffee of different blend and roast, the conditioning in each case being at 20° C. and 500/525 mm. Hg operating pressure range. Sample I was the same blend and grind as the coffee described earlier in connection with FIGURE 2, the sample being subjected to a medium roast. Sample II was a medium grind coffee comprised of New Guinean and Extra Prime Santos coffees and was given a high or dark roast. From FIGURE 4 it will be discerned that for removal of the same quantity of $CO_2$ gas, sample II could be more rapidly processed and that a greater volume of $CO_2$ gas evolves in a given period of time for a high roast coffee than lighter roasts.

It will be understood that in accordance with the present invention, the internal pressure in the container 1 is gradually reduced and the atmosphere in the interstitial space and headspace is purged of processing gas (mostly carbon dioxide) so that the rate of diffusion of the occluded carbon dioxide from the cells of the coffee is thereby accelerated and the amount of oxygen in the container is reduced. When the pressure in the container is reduced to the initial sub-atmospheric pressure level, evacuation is stopped so that the pressure in the headspace of the container and in the interstitial space in the coffee does not fall below the vapor pressures of a majority of the volatile constituents of the coffee.

As was indicated earlier, it is within the purview of the teaching of the present invention that conditioning can occur at various sub-atmospheric operating pressure ranges provided the initial sub-atmospheric pressure level is not below the vapor pressure of a majority of the flavor and aroma-giving volatile constituents of coffee. For example, conditioning can be carried out assuming an ambient temperature of 20° C. within a vapor pressure range 300/310–325 mm. Hg. While reduction in overall conditioning time can thus be achieved, coffee constituents which have some contributory effect on flavor and aroma will volatilize but their loss would be with understanding and acceptance of that effect on the overall quality of the coffee. FIGURE 3 is a chart showing processing time associated with two batches of coffee of the same blend, roast and grind as the coffee batches described earlier in connection with FIGURE 2 and which were conditioned in accordance with the present invention at 20° C. and at pressure ranges of 300/325 and 500/525 mm. Hg. The effect of the reduction in conditioning time is evident from FIGURE 3.

While reduction in operating pressure range as a means of speeding up conditioning is noteworthy, certain consideration of ultimate product acceptance must be taken into account in the selection of the operating pressure range. Thus, three other batches of the same blend and roast of coffee were conditioned at initial sub-atmospheric/ higher sub-atmospheric pressure levels of 400/425; 500/525; and 600/625 mm. Hg. Upon completion of conditioning, coffee was brewed from each of the batches and submitted to an expert coffee tastepanel for preference evaluation. The panel substantiated that while the coffee conditioned at 400/425 had fairly good coffee taste, the coffee conditioned at 500/525 mm. Hg gave the more pleasurable taste and aroma response. The coffee conditioned at 600/625 was not found to have any better taste than that conditioned at 500/525 but in fact took longer time to condition.

It will be seen from the foregoing then that the present invention is an important contribution to the art of conditioning freshly roasted coffee, particularly in the removal of a requisite quantity of $CO_2$ gas therefrom as an essential preliminary to packaging the coffee to reduce the $CO_2$ level to one compatible with the structural character of the ultimate final package whether that package be a fiber container, a flexible pack or a metal can. It is essential of course in accordance with the invention that the conditioning be done in a protective atmosphere maintained at sub-atmospheric operative pressure level but a pressure which is above the vapor pressure of a majority of the volatile constituents of coffee.

It also should be understood that the described apparatus is suited for operation with a plurality of conditioning containers arranged to be controlled from a common control panel and working in sequence so that as one container finishes discharging coffee, another container is ready to be discharged, with still other containers being at intermediate stages of the conditioning cycle.

It will thus be seen that the objects set forth above, among those made apparent from the preceding description, are efficiently attained. Since various changes in carrying out the process, and certain modifications in the apparatus of the invention may be made without departing from its scope, it is intended that all matter contained in the above description or shown in the accompanying drawings shall be interpreted as illustrative and not in a limiting sense.

I claim:

1. A method of conditioning freshly roasted coffee to remove $CO_2$ evolving therefrom incident to the roasting of the coffee, to lower the $CO_2$ pressure in the cells of the coffee to a level compatible with the structural character of the container in which it is to be packed said method comprising:
    (a) confining the freshly roasted coffee in a space evacuated to an initial sub-atmospheric pressure level which is not below the vapour pressures of a majority of the volatile constituents of the coffee whereby $CO_2$ evolves from the coffee into said space raising the pressure therein above said initial sub-atmospheric pressure level;
    (b) evacuating $CO_2$ from said space whenever the pressure therein has risen a predetermined amount above said initial sub-atmospheric pressure level to a higher sub-atmospheric pressure level and until the pressure in said space is again reduced to said initial sub-atmospheric pressure level; and
    (c) supplying a flow of inert gas to said space during the times $CO_2$ is being evacuated therefrom, the coffee being left resident in said space until such time as the pressure of $CO_2$ gas in the cells of the coffee reduces to a desired pressure level compatible with the structural character of said container.

2. The method of claim 1, wherein the initial sub-atmospheric pressure level is below at least 700 mm. Hg (20° C.).

3. The method of claim 1, wherein the initial sub-atmospheric pressure level is in the range between about 300 mm. Hg and about 700 mm. Hg (20° C.).

4. The method of claim 1, wherein the predetermined amount by which the initial sub-atmospheric pressure level of said space is allowed to rise before evacuating $CO_2$ therefrom, is in the range between about 10 mm. Hg and about 25 mm. Hg (20° C.).

5. The method of claim 2, wherein the predetermined amount by which the initial sub-atmospheric pressure level of said space is allowed to rise before evacuating $CO_2$ therefrom, is in the range between about 10 mm. Hg and about 25 mm. Hg (20° C.).

6. The method of claim 3, wherein the predetermined amount by which the initial sub-atmospheric pressure level of said space is allowed to rise before evacuating $CO_2$ therefrom, is in the range between about 10 mm. Hg and about 25 mm. Hg (20° C.).

7. The method of claim 1 wherein the space in which the coffee is confined is essentially oxygen-free before confining the coffee therein.

8. The method of claim 7 wherein said essentially oxygen-free space is established by purging same with an inert gas at a pressure above atmospheric pressure.

9. The method of claim 1 with the additional steps wherein the pressure in said space is raised to above atmospheric level by the admission of additional inert gas thereto just prior to the time of removal of coffee from said space and after reduction of the $CO_2$ pressure in the cells to said desired pressure level.

10. The method of claim 9, wherein the additional inert gas is admitted to said space at a pressure of up to about 5 p.s.i.g.

11. The method of claim 1, wherein the freshly roasted coffee is ground before being confined in said space and is confined therein for a period of between about two to about five hours.

12. The method of claim 1, wherein after the reduction of the $CO_2$ pressure in the cells to said desired pressure level, the coffee is removed from said space and packed in an atmosphere of inert gas in an air tight container.

13. The method of claim 1, wherein the flow of inert gas into said space is at a rate slightly less than the rate at which $CO_2$ gas is removed from said space.

14. The method of claim 1 wherein the $CO_2$ is evacuated from said space in the region of the greatest concentration of said $CO_2$.

References Cited

UNITED STATES PATENTS 3,333,963   8/1967   Moon et al. _____ 99—68

FRANK W. LUTTER, Primary Examiner

W. L. MENTLIK, Assistant Examiner

U.S. Cl. X.R.

99—152

PO-1050
(5/69)

UNITED STATES PATENT OFFICE
CERTIFICATE OF CORRECTION

Patent No. 3,506,446            Dated April 14, 1970

Inventor(s) Ronald Cheyney Champion

It is certified that error appears in the above-identified patent and that said Letters Patent are hereby corrected as shown below:

```
Column 1, line 59 "cos s" should read --costs--.
Column 4, line 29, "coffe" should read --coffee--.
Column 5, line 72, "Butane-2-ol-3-one" should read
                   --Butan-1-ol-2-one--.
Column 7, line 28, "2-(3'-furylethyl) methyl ketone" should
                   read --2-2'-furylethyl) methyl ketone--;
Column 7, line 29, "methylfuryl]" should read
                   --methylfuryl])--.
Column 8, line 1, "Pyyroles" should read --Pyrroles--.
Column 9, line 5, "qualties" should read --qualities--.
Column 12, line 33, "in" should read --is--.
Column 13, line 28, "exacuation" should read --evacuation--;
Column 13, line 38, "140" should read --740--.
```

SIGNED AND
SEALED
SEP 15 1970

(SEAL)
Attest:

Edward M. Fletcher, Jr.
Attesting Officer

WILLIAM E. SCHUYLER, JR.
Commissioner of Patents